United States Patent
Stones

(10) Patent No.: US 8,336,213 B2
(45) Date of Patent: *Dec. 25, 2012

(54) HANDLE ASSEMBLY FOR POWER TOOL

(75) Inventor: Kevin Stones, Bishop Auckland (GB)

(73) Assignee: Black & Decker Inc.

( * ) Notice: Subject to any disclaimer, the term of this patent is extended or adjusted under 35 U.S.C. 154(b) by 760 days.

This patent is subject to a terminal disclaimer.

(21) Appl. No.: 10/911,344

(22) Filed: Aug. 4, 2004

(65) Prior Publication Data

US 2005/0102841 A1 May 19, 2005

(30) Foreign Application Priority Data

Aug. 4, 2003 (GB) ................................. 0318150.0
Aug. 9, 2003 (GB) ................................. 0318751.5
May 17, 2004 (GB) ................................. 0410917.9

(51) Int. Cl.
   B26B 19/02 (2006.01)
   B26B 27/00 (2006.01)
(52) U.S. Cl. .......................... 30/216; 30/296.1; 30/298
(58) Field of Classification Search ................ 30/391, 30/210, 216, 206, 232, 312, 517, 520, 381, 30/382, 296.1, 298, 276, 231; 16/430, 901, 16/110.1, 111.1, 408, 409, 444, 445, 406, 16/411, 419, 422; 451/344, 350–359; D8/65, D8/67, 69, 8; 74/543
See application file for complete search history.

(56) References Cited

U.S. PATENT DOCUMENTS 135,628 A * 2/1873 Clemson ........................ 30/519
(Continued)

FOREIGN PATENT DOCUMENTS

DE 195 27 207 A 2/1996
(Continued)

OTHER PUBLICATIONS

Lawnmowers Direct, FLYMO Easi-Trim EHT 420, www.lawnmowersdirect.co.uk/tmd/product.asp?dept_id=17&pf_id=0042.

*Primary Examiner* — Hwei C Payer
(74) *Attorney, Agent, or Firm* — John Yun

(57) ABSTRACT

A handle assembly for a power tool is disclosed, in which the power tool has a housing, a motor provided in the housing, and an output shaft adapted to be caused by said motor to actuate a working member extending from the housing along a first axis (A-A). The handle assembly (102) comprises a front handle (106), a rear handle (107) integral with the front handle, and a mounting portion adapted to be mounted to the housing of the tool, wherein the front handle (106) forms an obtuse angle with the axis (A-A) of the working member in use. This last feature makes the power tool more comfortable for a user to operate, provided that the centre of mass of the power tool lies in the region between the front handle (106) and the rear handle (107). This will usually be the case, since the heaviest parts of the tool are generally the working member and the motor housing thereof. Thus the user does not have to stretch his forward arm as far relative to the rear handle (107) as he would have to do when using the handle assembly of a conventional power tool of this type.

12 Claims, 16 Drawing Sheets

U.S. PATENT DOCUMENTS

| | | | | |
|---|---|---|---|---|
| 1,838,690 | A * | 12/1931 | Lepiane et al. | 30/216 |
| 1,919,516 | A * | 7/1933 | Koch | 30/216 |
| 1,937,586 | A * | 12/1933 | Ortt | 30/199 |
| 3,050,854 | A * | 8/1962 | Becker et al. | 30/276 |
| 3,409,056 | A * | 11/1968 | Albrecht | 30/381 |
| 3,579,827 | A * | 5/1971 | Grahn | 30/144 |
| 3,902,243 | A | 9/1975 | Klebe, Jr. | |
| 3,909,943 | A * | 10/1975 | Buschman | 30/216 |
| 3,962,924 | A * | 6/1976 | Glover et al. | 74/50 |
| 3,991,468 | A * | 11/1976 | Williams | 30/298 |
| 4,145,810 | A * | 3/1979 | Belliston | 30/296.1 |
| 4,206,657 | A | 6/1980 | Palm | |
| 4,226,021 | A * | 10/1980 | Hoff | 30/276 |
| 4,282,652 | A * | 8/1981 | Ballas, Sr. | 30/276 |
| 4,638,562 | A * | 1/1987 | Drake | 30/296.1 |
| 4,651,420 | A * | 3/1987 | Lonnecker | 30/296.1 |
| 4,787,145 | A * | 11/1988 | Klicker et al. | 30/275.4 |
| 4,856,195 | A * | 8/1989 | Grossmann et al. | 30/369 |
| 4,979,306 | A * | 12/1990 | Koga et al. | 30/381 |
| 4,991,298 | A * | 2/1991 | Matre | 30/392 |
| 5,031,395 | A * | 7/1991 | Ohkanda et al. | 56/236 |
| 5,145,044 | A * | 9/1992 | Kramer et al. | 192/131 R |
| 5,150,523 | A | 9/1992 | McCurry | |
| 5,531,027 | A * | 7/1996 | Martinez et al. | 30/216 |
| 5,687,483 | A * | 11/1997 | Neubert et al. | 30/312 |
| 5,882,249 | A * | 3/1999 | Ferland | 451/359 |
| 6,018,939 | A * | 2/2000 | Nagashima | 56/237 |
| D434,620 | S * | 12/2000 | Martin | D8/8 |
| 6,324,728 | B1 * | 12/2001 | Blankenheim | 16/431 |
| 6,439,088 | B1 * | 8/2002 | Eytchison et al. | 83/13 |
| D505,602 | S * | 5/2005 | Houghton | D8/8 |
| D505,844 | S * | 6/2005 | Houghton | D8/8 |
| 6,942,557 | B2 * | 9/2005 | Sun | 451/344 |
| 6,973,726 | B2 * | 12/2005 | Kramer | 30/216 |
| 6,973,728 | B2 * | 12/2005 | Ellson et al. | 30/276 |
| 2004/0035009 | A1 * | 2/2004 | Richards | 30/381 |
| 2004/0128839 | A1 * | 7/2004 | Shaffer et al. | 30/276 |
| 2005/0198782 | A1 * | 9/2005 | Hsieh | 16/430 |
| 2007/0050993 | A1 * | 3/2007 | Phillips | 30/392 |

FOREIGN PATENT DOCUMENTS

| | | |
|---|---|---|
| EP | 0214455 A1 | 3/1987 |
| EP | 0 267 472 A1 * | 5/1988 |
| EP | 0 687 410 A1 | 12/1995 |
| EP | 0834 248 A | 4/1998 |
| EP | 1 020 257 A | 7/2000 |
| EP | 1131994 A1 | 9/2001 |
| FR | 2 738 710 A | 3/1997 |
| GB | 1 193 654 A | 6/1970 |
| GB | 2336987 | 11/1999 |
| GB | 2384678 A | 8/2003 |
| GB | 2396580 | 6/2004 |
| JP | 2002058341 A | 2/2002 |

* cited by examiner

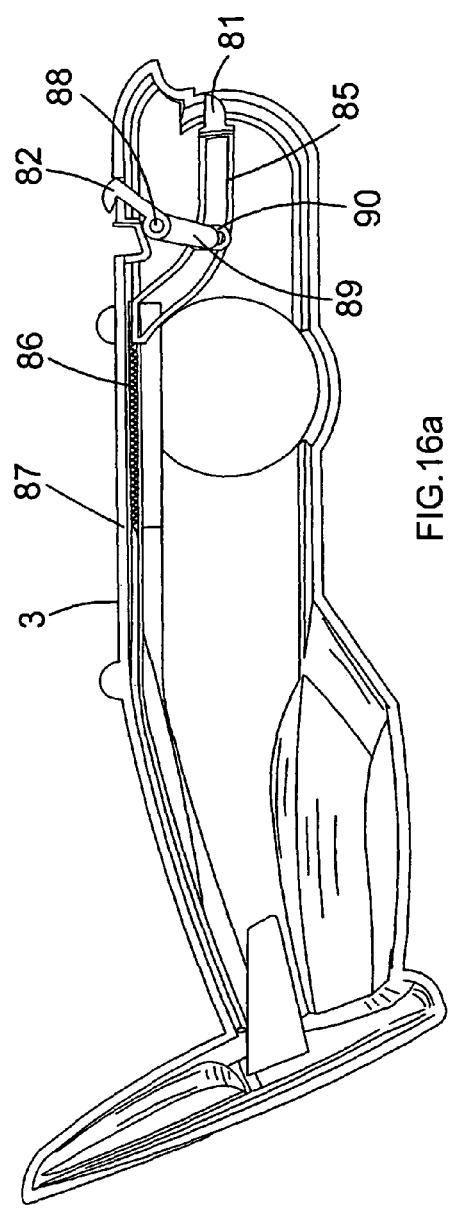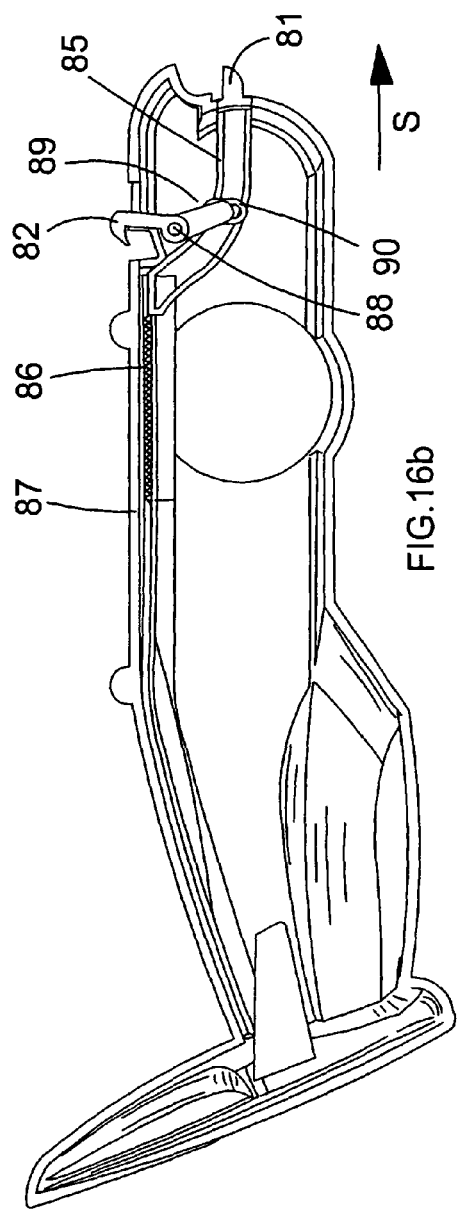
FIG.16a
FIG.16b

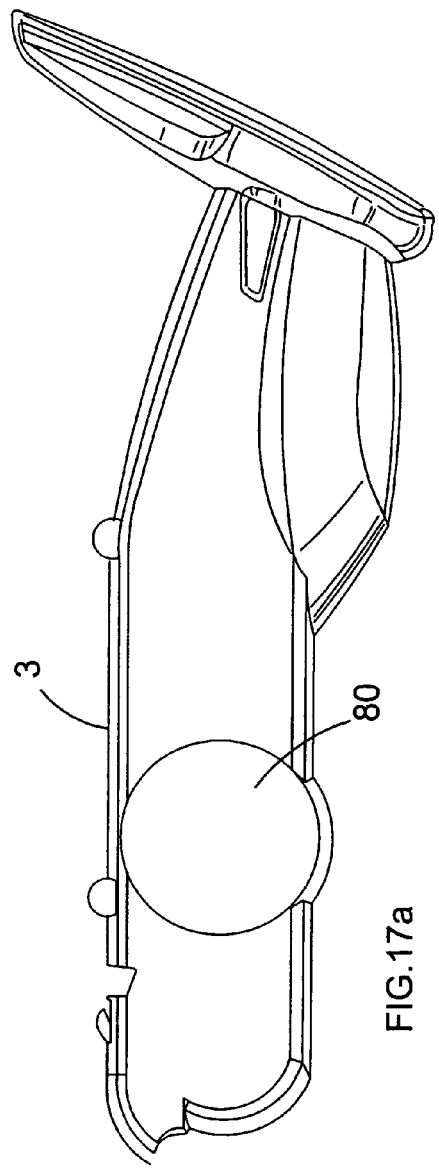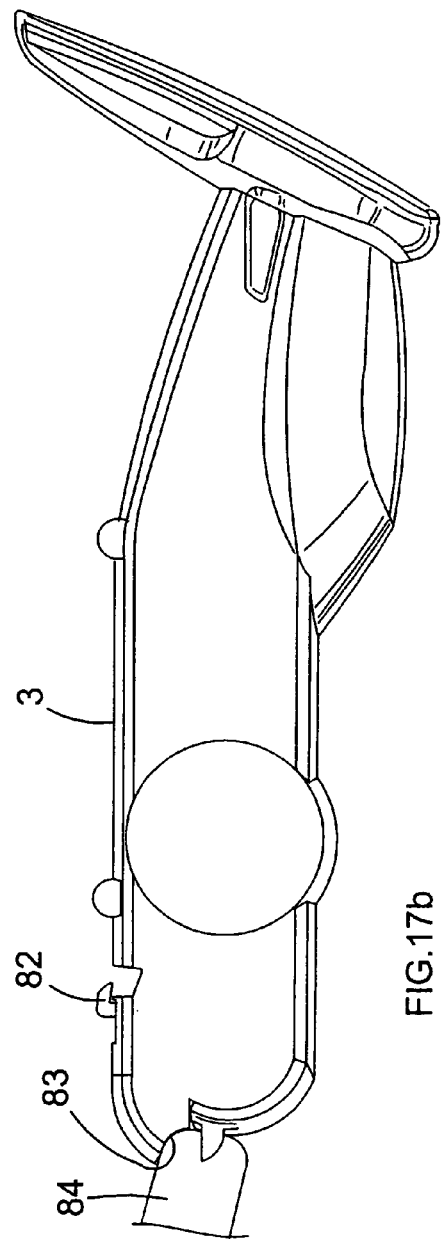

HANDLE ASSEMBLY FOR POWER TOOL

BACKGROUND OF THE INVENTION

The present invention relates to a handle assembly for a power tool, and to a power tool incorporating such an assembly. The invention relates particularly, but not exclusively, to a handle assembly for a hedge trimmer, and a hedge trimmer incorporating such a mechanism.

Hedge trimmers are power tools for general garden use with an axially reciprocating blade comprising a plurality of teeth disposed adjacent a stationary blade, the teeth of the stationary blade providing a reaction force for the teeth of the reciprocating blade.

Most hedge trimmers are provided with two handles for the user to grip. This is generally for two reasons. Firstly, a hedge trimmer is easier to manipulate when held with both hands than when held with one hand. This provides the user with greater control over the hedge trimmer and therefore facilitates more accurate cutting. Secondly, a two handed grip is a safety feature. It is significantly easier to lose control of a hedge trimmer when holding it with one hand, and therefore a two handed grip allows much safer use of the hedge trimmer.

It is desirable for hedge trimmers to have handles located remotely from the centre of mass of the hedge trimmer, as this makes it easier for a user to apply torque to the hedge trimmer blade.

A known hedge trimmer, supplied by Flymo SA, for example under the trade mark FLYMO EASI-TRIM EHT 420, has a handle assembly in which front and rear handles are formed as opposite sides of a generally symmetrical loop. This known hedge trimmer suffers from the drawback that as the front handle is angled forwardly (i.e. the front handle makes an acute angle with the blade assembly), there is a limit to the size of the front handle, as the front handle will eventually come into contact with the hedge trimmer hand guard.

Preferred embodiments of the present invention seek to overcome the above disadvantage of the prior art.

SUMMARY OF THE INVENTION

According to an aspect of the present invention, there is provided a handle assembly for a power tool having a housing, a motor provided in the housing, and an output shaft adapted to be caused by said motor to actuate a working member extending from the housing along a first axis, the handle assembly comprising:— a front handle;

a rear handle integral with said front handle; and a mounting portion adapted to be mounted to the housing of the tool;

wherein said front handle forms an obtuse angle with the axis of the working member in use.

By providing a handle assembly with a front handle that is angled rearwardly relative to the working member, this provides the advantage that the front handle can be made as large as is desirable. This also provides the advantage that the user does not have to stretch to reach the front handle.

The front handle and rear handles may be oriented to enable a user to grip the front handle with a first hand and the rear handle with a second hand such that the axes of the user's wrists are substantially parallel to one another.

This provides the advantage that the user can hold the tool with the blade in any orientation without having to twist one wrist relative to the other, thereby making holding of the hedge trimmer more comfortable, and minimising the application of undesirable torque to the tool.

Said front and rear handles may define a continuous loop.

The power tool may further comprise first switching means provided on said front handle, and second switching means formed on said rear handle, wherein said power tool is operable on actuation of both first and second switching means.

By providing a first switch on the front handle, and a second switch on the rear handle, wherein the switches must be simultaneously actuated to operate the hedge trimmer, this provides the advantage that the user must first hold the hedge trimmer with two hands before he can operate it, thus ensuring safe and correct handling of the tool.

Said power tool may be a hedge trimmer.

According to another aspect of the present invention, there is provided a power tool having a housing, a motor provided in the housing, an output shaft adapted to be caused by said motor to actuate a working member extending from the housing along a first axis, and a handle assembly as defined above.

BRIEF DESCRIPTION OF THE DRAWINGS

Preferred embodiments of the present invention will now be described, by way of example only and not in any limitative sense, with reference to the accompanying drawings in which:—

FIG. 10b is a top view of the gear conversion mechanism of FIG. 10a; and

FIG. 16*a* is a cross sectional side view of the hedge trimmer housing with the latch mechanism in the open position;

FIG. 16*b* is a cross sectional side view of the hedge trimmer housing of FIG. 17*a* with the latch mechanism in the closed position;

FIG. 17*a* is a side view of the hedge trimmer housing, with the latch mechanism in the open position; and FIG. 17*b* is a side view of the hedge trimmer housing of FIG. 16*a*, with the latch mechanism in the closed position and engaging the hedge trimmer handle assembly.

DETAILED DESCRIPTION OF THE DRAWINGS

Figure 1:
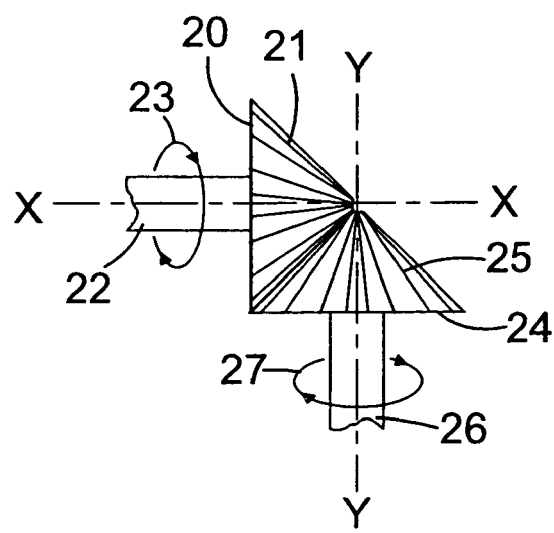
FIG. 1 is a side view of a prior art truncated conical bevel gear assembly for use in a hedge trimmer.
Figure 2:
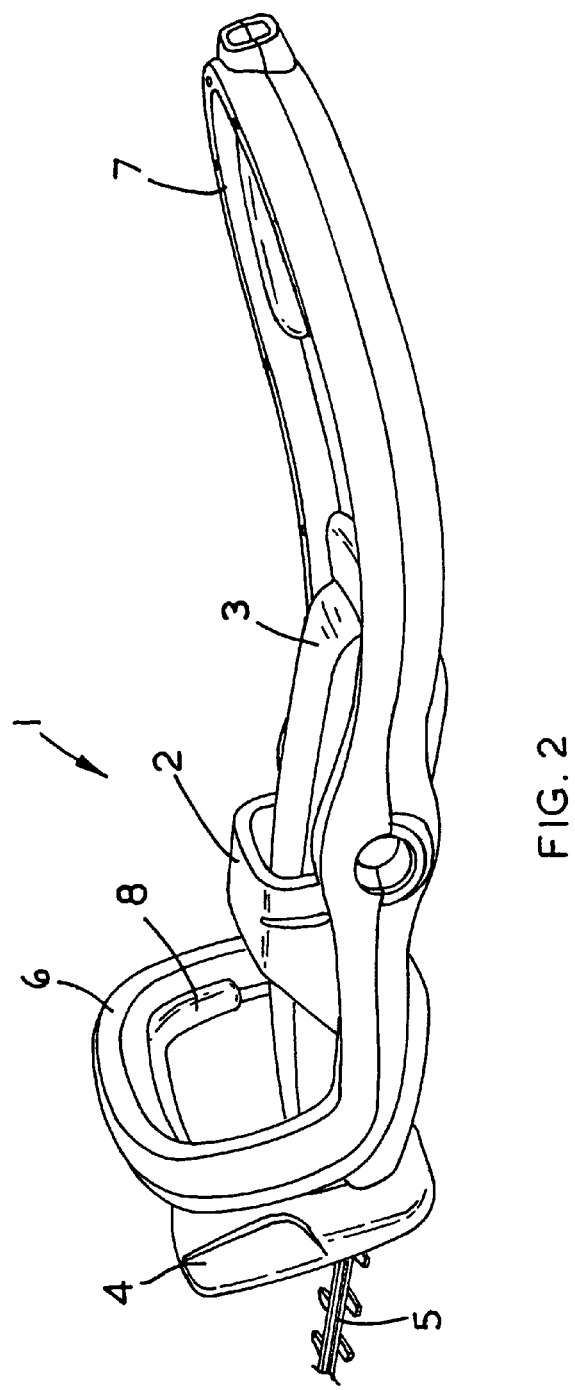
FIG. 2 is a perspective view from a first side of a hedge trimmer of a first embodiment of the present invention.

Referring to FIG. 2, a hedge trimmer (1) comprises a handle assembly (2) formed from durable plastics material pivotably connected to a housing (3). A guard (4) is formed integrally with the housing (3) and an electric motor (not shown) is disposed axially within the housing (3) such that the axis of rotation of an output shaft (not shown) of the motor is generally parallel to the direction of reciprocating motion of a blade assembly (5).

The blade assembly (5) extends forwardly of the housing (3). The electric motor (not shown) is connected to the blade assembly via a drive conversion mechanism, the operation of which will be described in further detail below. The blade assembly (5) comprises a stationary blade disposed adjacent to a blade adapted to execute reciprocating movement along a longitudinal axis of the stationary blade. In this way, the stationary blade provides a reaction force for the reciprocating blade to grip against and cut. The operation of this type of blade assembly is well known in the art and will not be described in any further detail herein.

The handle assembly (2) comprises a forward handle (6) and a rear handle (7). Both forward and rear handles (6), (7) are formed integrally from moulded durable plastics and enable a user to hold the hedge trimmer in a variety of ways. As is well known in the art, it is desirable for certain power tools such as chainsaws, hedge trimmers and circular saws to have two handles for the user to grip, one with either hand. A two-handle assembly has two advantages. Firstly, when the tool is gripped in both hands it is more stable in the user's hands and therefore easier to control, which enables more accurate and precise cutting. Secondly, a two-handed grip on the hedge trimmer is a lot safer than a single handed grip. It is a lot easier for a user to lose control of a hedge trimmer when gripping it with only one hand.

Figure 3:
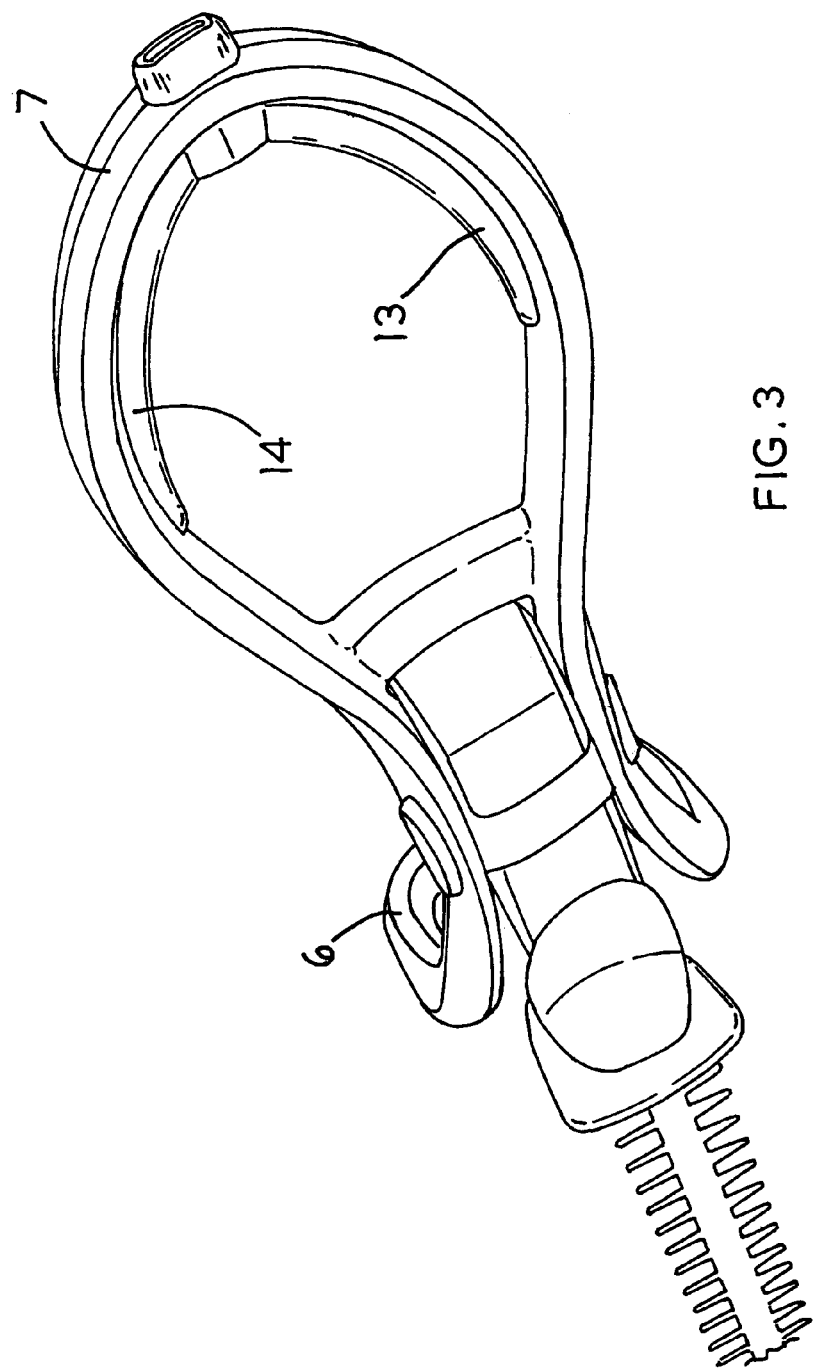
FIG. 3 is a perspective view from below of the hedge trimmer of FIG. 2.

The hedge trimmer is provided with a dual switching mechanism. In order to activate the hedge trimmer, the user must simultaneously depress a forward switch (8) and either one of rear switches (13), (14), as shown in FIG. 3. As a result, it is impossible for the user to activate the hedge trimmer without first gripping it with both hands.

Figure 4:
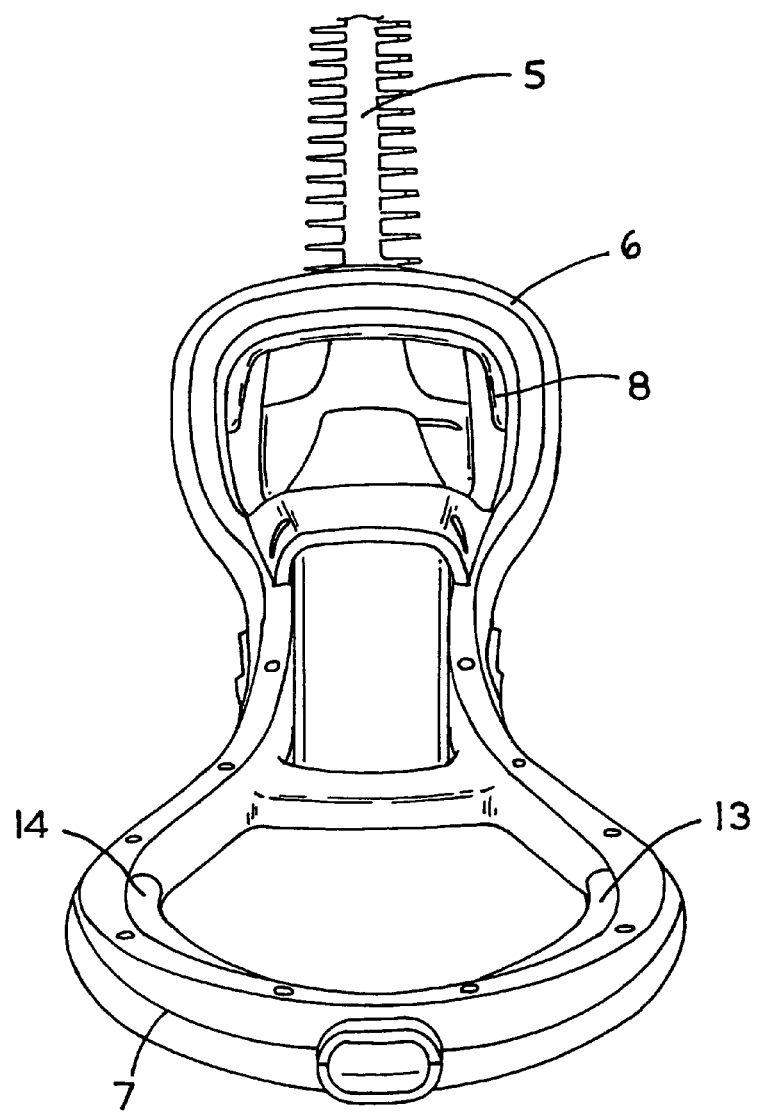
FIG. 4 is a rear perspective view of the hedge trimmer of FIG. 2.

It is desirable when operating a hedge trimmer with the blade in the vertical plane for the user to be able to grip the hedge trimmer without twisting either wrist at an angle relative to the other. Referring to FIG. 4, the present invention provides a handle assembly which allows a left-handed user and a right-handed user to operate the hedge trimmer in any orientation with the wrists of each arm aligned, i.e. with the wrists arranged along parallel axes. For example, the right-handed user would grip forward handle (6) with his left hand such that the fingers of his left hand pass around the front of forward handle (6) and grip switch (8) with the fingertips of his left hand. The right-handed user would place his right hand around rear handle (7) such that the fingertips of his right hand grip switch (13). It can be seen that in this orientation the right-handed user holds the hedge trimmer such that the insides of his wrists are facing each other and his wrists are aligned in planes generally parallel to the plane of the blade. The same can be said of the left-handed user. However the left-handed user would grip forward handle (6) with his right hand and rear handle (7) with his left hand such that the fingertips of his left hand are in a position to depress switch (14).

This feature of the present invention offers several advantages over the prior art. Firstly, holding the hedge trimmer without a twist in the user's arm is more comfortable, and affords the user more control over the hedge trimmer blade. Secondly, prior art hedge trimmers must be held with a twist in the user's arm. Over prolonged periods of use, the user's arms may tire, and apply an unwanted torque to the hedge trimmer as the muscles of the user's forearms attempt to orientate themselves into a more comfortable position. This makes it more difficult to accurately cut with the hedge trimmer.

Figure 5:
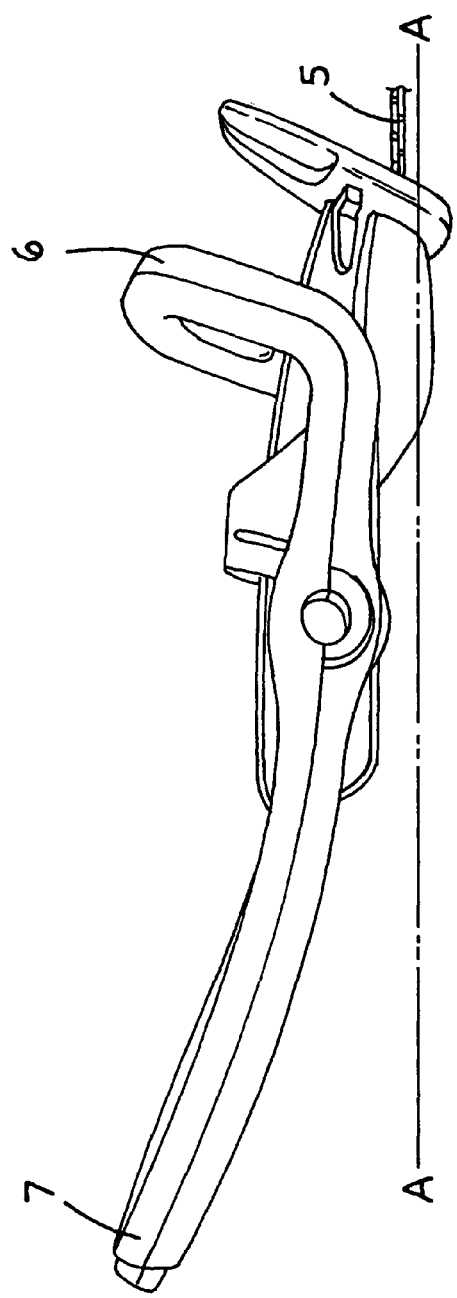
FIG. 5 is a side perspective view of the hedge trimmer of FIG. 2, from the opposite side as that shown in FIG. 2.

Referring to FIG. 5, line A-A represents the plane of blade assembly (5). The plane of rear handle (7) is at an angle to line A-A such that the rear part of rear handle (7) is raised substantially away from the plane of blade (5). As a result of this, the knuckles of the hand of the user that is gripping rear handle (7) are raised away from the surface of the hedge being cut. This provides the advantage that the user's knuckles avoid any grazing or cutting resulting from contact with the hedge, or with the ground when carrying out low cutting.

Figure 6:
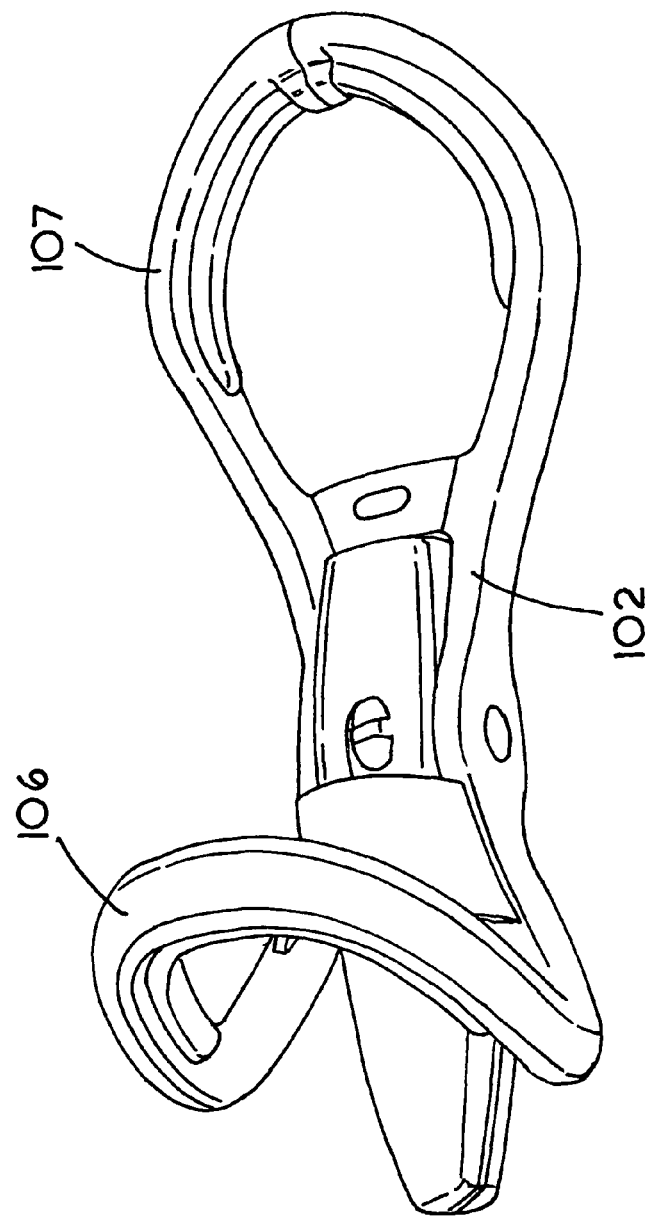
FIG. 6 is a perspective view from above of a hedge trimmer of a second embodiment of the present invention.
Figure 7:
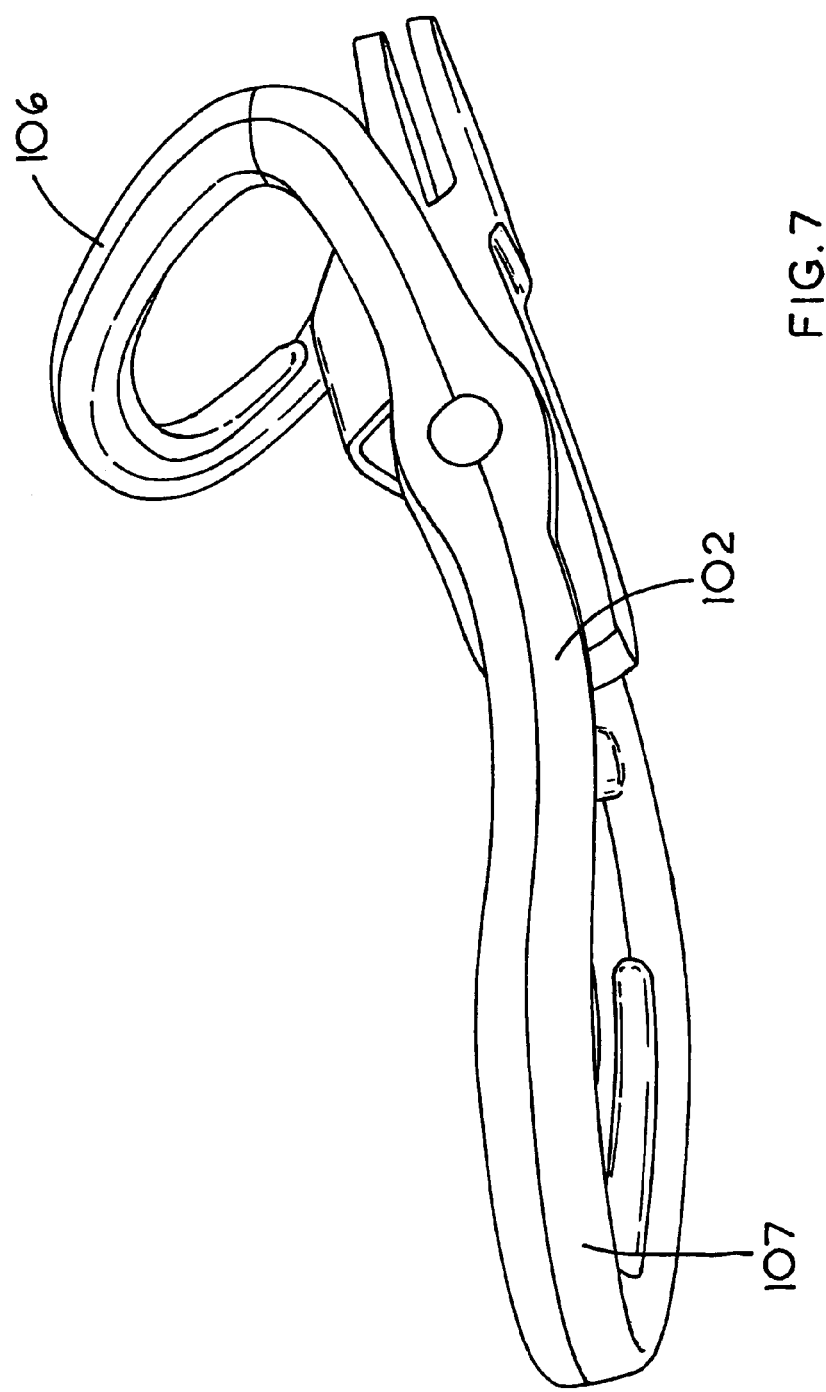
FIG. 7 is a side perspective view of the handle assembly and body of the hedge trimmer of FIG. 6.

Referring to FIGS. 6 and 7, in which parts common to the embodiment of FIGS. 2 to 5 are denoted by like reference numerals but increased by 100, a second embodiment of the handle assembly (102) is shown. It can be seen that front handle (106) is swept back at a greater angle relative to the plane of the blade compared with the angle of front handle (6) relative to the plane of blade (5) as shown in FIG. 5. This feature makes the hedge trimmer more comfortable for the user to operate provided that the centre of mass of the hedge trimmer lies in the region between front handle (106) and rear handle (107) which will usually be the case, since the heaviest parts of the hedge trimmer are generally the blade and the motor housing. The user does not have to stretch his forward arm as far relative to the rear handle as he would do when using the handle assembly shown in FIG. 5.

It is therefore desirable to have the rear handle located as far away from the centre of mass as is possible. Since the two heaviest components of a hedge trimmer are generally the electric motor disposed in the housing and the forward blade assembly, the centre of mass of the hedge trimmer generally lies between the motor and the blade.

In order to make the hedge trimmer easier to manipulate, it is desirable to locate the rear handle (7), (107) as far away from the centre of mass as possible. This is because the further away the rear handle is from the centre of mass, the less force is needed to be applied to the rear handle to apply the same torque to the hedge trimmer. One way of achieving this is to make the rear handle as large as possible without increasing the weight of the rear handle, and for this reason the rear handle (7), (107) of the hedge trimmer is formed into the curved bar loop shape with a space enclosed as is best shown in FIG. 2 or in FIG. 6.

The handle assembly (7) of the present invention enables the user to operate the hedge trimmer for cutting a horizontal surface such that the wrists of the user's arms are oriented generally parallel to one another. Also, as described above, when the blade is required to be operated in the vertical plane, the user can operate the hedge trimmer with his wrists arranged in generally parallel vertical planes.

A problem can arise with prior art hedge trimmers when a horizontal surface to be cut is high up relative to the user such as the horizontal upper surface of a tall hedge, as the user may have to stretch and hold the hedge trimmer above his head. This is undesirable for the user especially when the user is on stepladders or other apparatus to raise the user from the ground. When the user is holding the hedge trimmer high up relative to his body or even holding the hedge trimmer above his head in order to cut a horizontal surface, the user is less stable than he would be were he operating the hedge trimmer further down relative to his body. Furthermore, although hedge trimmers can generally be operated upside down, it has been found that consumers are generally very reluctant to operate hedge trimmers upside down whilst held above the head.

Figure 8:
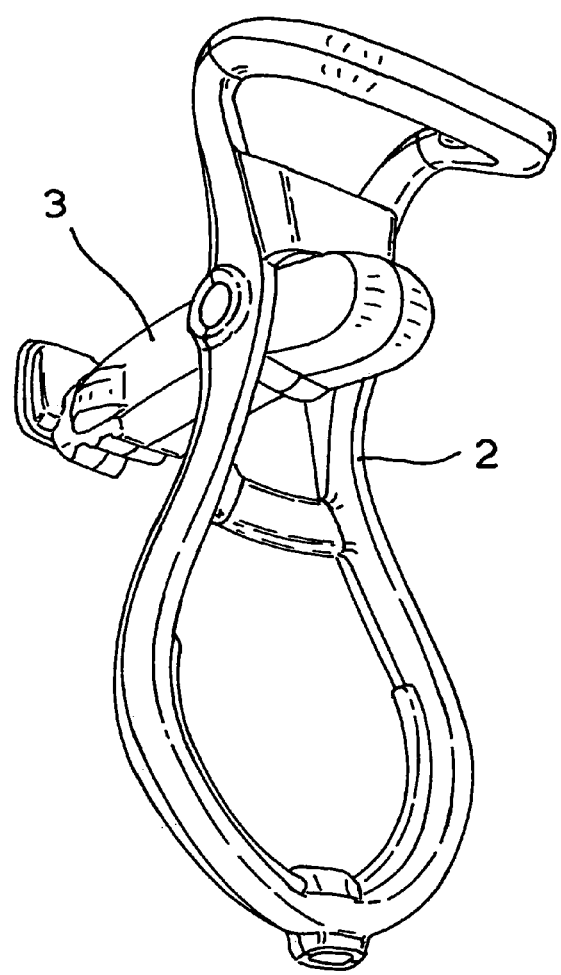
FIG. 8 is a side and rear perspective view of the handle assembly and body rear of the hedge trimmer of the present invention with the body portion tilted at an angle to the handle assembly.
Figure 9:
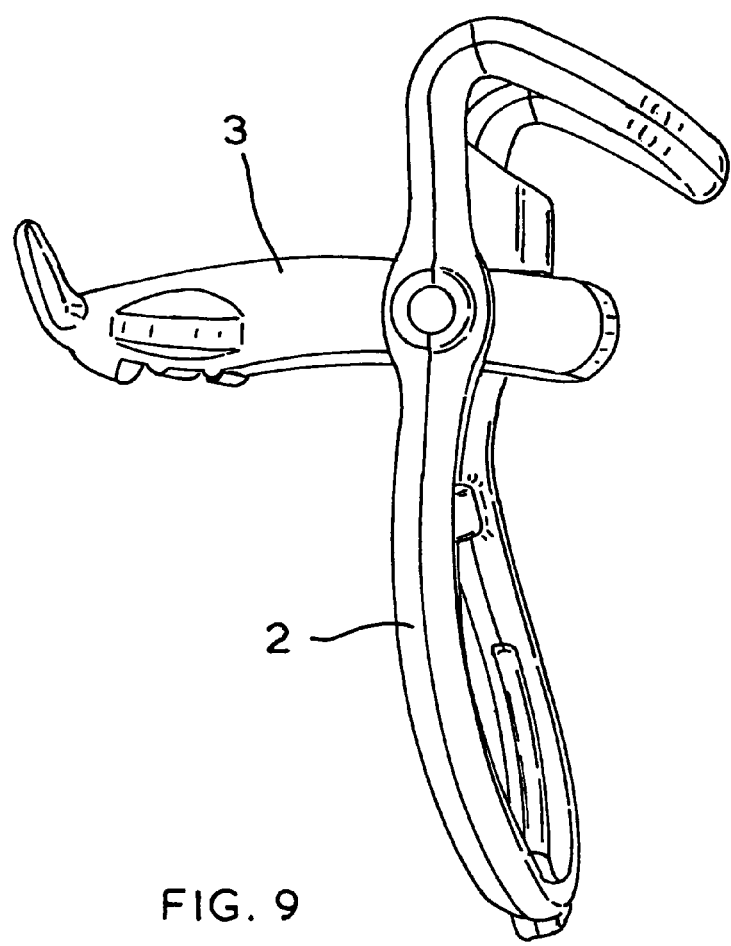
FIG. 9 is a further side perspective view of the hedge trimmer of FIG. 8.

Referring to FIGS. 8 and 9, the hedge trimmer is shown without the forwardly projecting blade where the body housing (3) has been pivoted relative to the handle assembly (2). In this orientation, the hedge trimmer is operated in exactly the same way as before, with the user gripping both forward and rear handles and depressing forward and rear switches respectively. This feature makes it easier for the user to view along the plane of the blade when cutting the top of a tall hedge, and more comfortable for horizontal cutting in a position high up relative to the user's body. This is because instead of the user having to hold the handles horizontally at eye level as with prior art hedge trimmers, the user can now hold the handle assembly in front of his body whilst looking along the plane of the blade.

Referring to FIGS. 16a and 16b, the operation of the latch mechanism for holding the hedge trimmer in either of the orientations described above will now be described.

A first retaining member (81) is mounted at a first end of a bracket (85), and the other end of bracket (85) is mounted on a compression spring (86). Compression spring (86) is fixed to the body of the hedge trimmer housing at (87). A second retaining member (82) is able to pivot about a pin (88), pin (88) being fixed relative to the housing (3). Second retaining member (82) is also rigidly fixed to a first end of a lever (89), the second end of lever (89) being slidable in a second bracket (90), second bracket (90) being formed in first bracket (85).

When the first bracket (85) is moved in the direction of arrow S from the configuration shown in FIG. 16a to the configuration of FIG. 16b as a result of compression spring (86) extending, it can be seen that firstly the first retaining member (81) is pushed out of the back of the housing (3). Secondly, as a result of lever (89) sliding upwardly in second bracket (90), the second retaining member (82) is pivoted about pin (88) and out of housing (3).

In the configuration of FIG. 16b, either the first or second retaining means (81, 82) will engage with a corresponding portion of the handle assembly (not shown), and a user would release the mechanism simply by pushing the retaining member which is not in engagement with the handle assembly back into the housing, as this action would also result in retracting the other retaining member from engagement with the handle assembly.

Referring to FIGS. 17a and 17b, the hedge trimmer housing (3) engages the hedge trimmer handle assembly at a cylindrical pivot (80) such that the housing (3) can rotate about pivot portion (80). The hedge trimmer can be operated in two separate orientations, the in-line orientation as shown in FIG. 2, or the orientation shown in FIGS. 8 and 9 where the hedge trimmer housing (3) is rotated through 900 relative to the hedge trimmer handle assembly (2).

In order to retain the hedge trimmer housing (3) in position relative to the handle assembly (not shown), the housing (3) is provided with a first retaining member (81) and a second retaining member (82). Both first and second retaining members (81, 82) are retractable relative to the housing (3), and are shown in their respective retracted positions in FIG. 17a. The rear end of housing (3) has an integrally formed abutment surface (83) shaped to receive an engaging portion (84) of handle assembly (2). It can be seen that the engaging portion (84) of the handle assembly is received between abutment surface (83) of the housing (3) and the first retaining member (81) such that the engaging portion (84) can not move in either the upwards or downwards direction relative to housing (3). The first retaining member (81) is so shaped that the engaging portion (84) can slide into engagement with abutment surface (83) by displacing retaining member (81), but cannot move out of engagement with abutment surface (83) until retaining member (81) is retracted into the housing (3).

When the hedge trimmer is used in the orientation shown in FIGS. 8 and 9, second retaining member (82) grips a second engaging portion (not shown) of the handle assembly, and in this orientation even though first retaining member (81) is deployed, it is not in use. In order to release the latch mechanism, either first or second retaining members (81, 82) can be depressed by the user, depending on which one is not in engagement with the handle assembly, which simultaneously moves both first and second retaining members (81, 82) into the housing.

Figure 13:
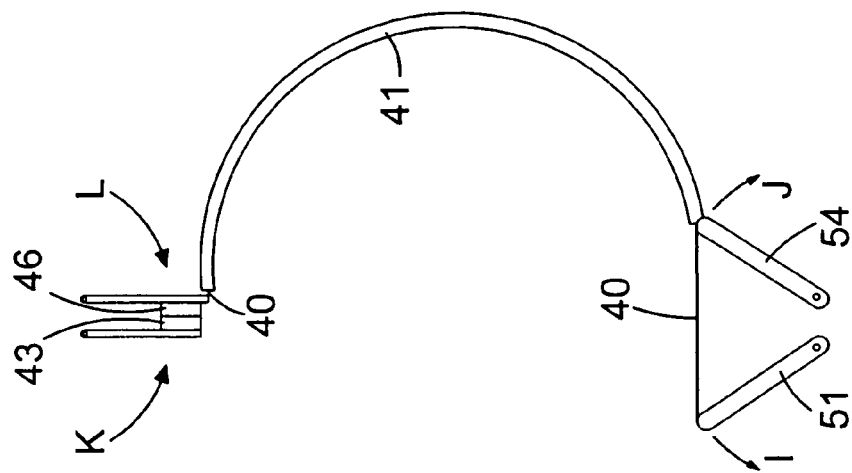
FIG. 13 is a schematic view of the switching mechanism of FIG. 12 in the closed position.
Figure 12:
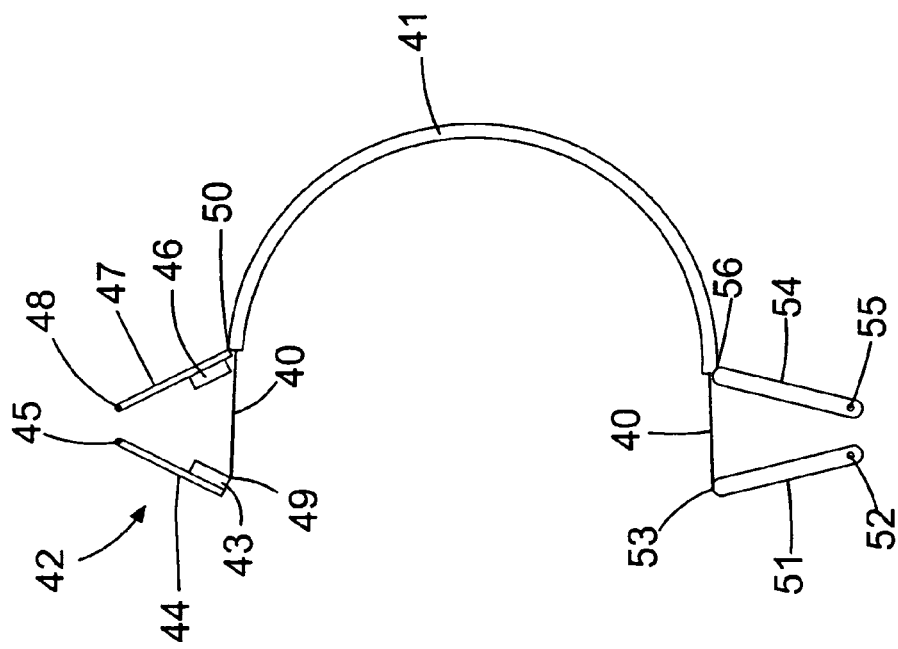
FIG. 12 is a schematic view of a switching mechanism of the present invention in the open position.

Referring to FIGS. 12 and 13, the dual switching mechanism of the present invention will now be described.

A bowden cable, such as that used to operate the brakes on a pedal bicycle, consists of an inner cable (40) surrounded by an outer sheath (41). The inner cable (40) passes through the outer cable (41) and is slidable relative thereto. An electrical contact shown generally by (42) comprises a first metallic pad (43) mounted on an arm (44), the arm being pivotable about point (45) and a second metallic pad (46) mounted on a second arm (47), the second arm being pivotable about point 48 such that metallic pads (43) and (46) can be pivoted towards each other, and into contact.

A first end of inner cable (40) is attached to metallic pad (43) at point (49), and a first end of outer cable (41) is attached to arm (47) at point (50).

A first switch (51) comprises an arm that is pivotable about point (52), the arm being attached to a second end of inner cable (40) at point (53). A second switch (54) is pivotable about point (55) and is attached to the outer cable at point (56).

Referring to FIG. 13, first switch (51) and second switch (54) are operated by a user applying pressure and pivoting them away from each other in the direction shown by arrows I and J. As first switch (51) is rigidly attached to the inner cable (40), and second switch (54) is rigidly attached to the outer cable (41), the pivoting motion of the switches in opposite directions draws the inner cable (40) through outer cable (41), whilst at the same time second switch (54) pushes outer cable (41) around inner cable (40). As a result of this, inner cable (40) pulls first metallic pad (43) in the direction of arrow K, and outer cable (41) pushes the second metallic pad (46) in the direction of arrow L such that pads (43), (46) come into contact.

It can be seen then that if only one switch, either (51) or (54), is moved whilst the other switch remains in the open position, the resulting movement of the bowden cable would only consist of independent movement of either the inner (40) or outer cable (41) such that the contact would only be half closed, as only one metallic pad would be moved into a contacting position.

It should also be appreciated that further embodiments of a switching mechanism of this type are possible with more than two switches. For example, a single inner cable (40) can be provided with a plurality of outer sheaths (41), each outer sheath moving independently of one another which provides the option of adding more switches and/or electrical contacts. It should also be noted that in practice, taking the example of a two switch mechanism, the mechanism will be set up such that closing one switch will have the result of partially closing the contact by more than half the distance required to fully close the contact, and closing the second switch will also have the result of more than half closing the contact. In this way, it is ensured that the contact will actually be closed when both switches are closed.

It should also be appreciated that FIGS. 12 and 13 are only a schematic representation of the switching mechanism, and in practise the contacts be in the form of something other than pivoting metallic pads, as will be described below.

Referring to FIGS. 14a to 15c, the operation of the pivoting switching mechanism will now be described.

Figure 14A:
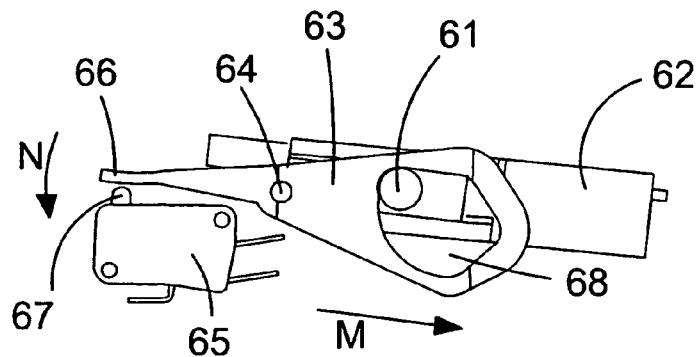
FIG. 14a is a side view of the switching mechanism and relay of the present invention in the open position where the handle assembly is in the horizontal orientation relative to the housing.

Referring to FIG. 14a, a pin (61) is held in a pin housing (62) which is disposed in the hedge trimmer handle assembly (not shown). The pin (61) and pin housing (62) are slidable relative to the hedge trimmer handle assembly (not shown) in the direction of arrow M. Pin (61) projects outwardly from housing (62) and is received in an aperture (68) formed in an arm member (63). Arm member (63) is mounted to the hedge trimmer body housing (not shown) by a pin (64). Arm member (63) is pivotable about pin (64) in the direction of arrow N relative to the hedge trimmer housing (not shown). An electrical relay (65) is disposed in the hedge trimmer housing (not shown) such that when arm (63) is pivoted in the direction of arrow N, a remote end (66) of arm (63) depresses a switch (67) and closes relay (65).

Figure 14B:
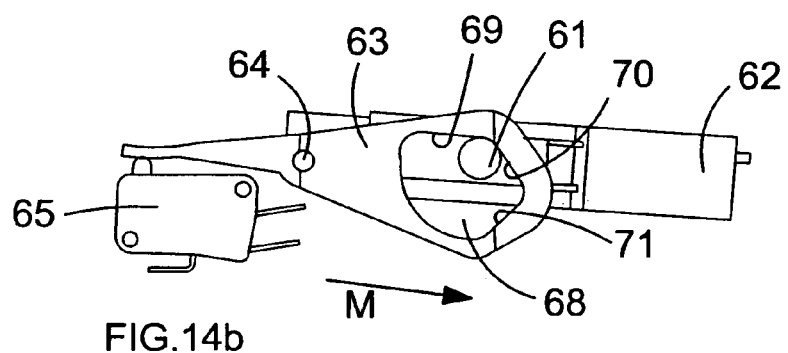
FIG. 14b is a side view of the switching mechanism of FIG. 14A in the partially closed position.
Figure 14C:
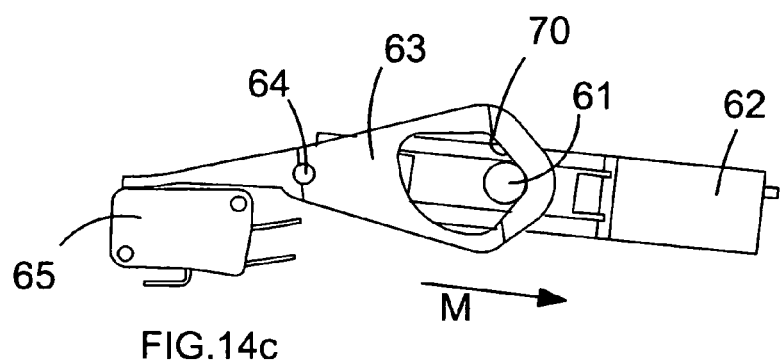
FIG. 14c is a side view of the switching mechanism and relay of FIG. 14A in which the relay is closed.

Referring now to FIG. 14b, when a first switch (not shown), is depressed by the user, a cable (not shown) causes pin (61) to slide in the direction of arrow M along cam surface (69) provided in aperture (68). It can be seen, however, that the movement of pin (61) is insufficient to cause arm member (63) to pivot about pin (64) and close relay (65). Referring now to FIG. 14c, in order to close the relay, the user must depress a second switch (not shown) provided on the handle assembly, which causes pin (61) to slide a further distance in the direction of arrow M along a second cam surface (70), provided in aperture (68), causing arm member (63) to pivot about point (64) and close the relay (65).

It can therefore be seen that in order to close the relay (65), a user must depress both first and second hedge trimmer switches, which in the embodiment of the hedge trimmer shown in FIG. 4 for example, would be switch (8) formed on front handle (6) and either one of switches (13), (14) formed on rear handle (7).

Figure 15A:
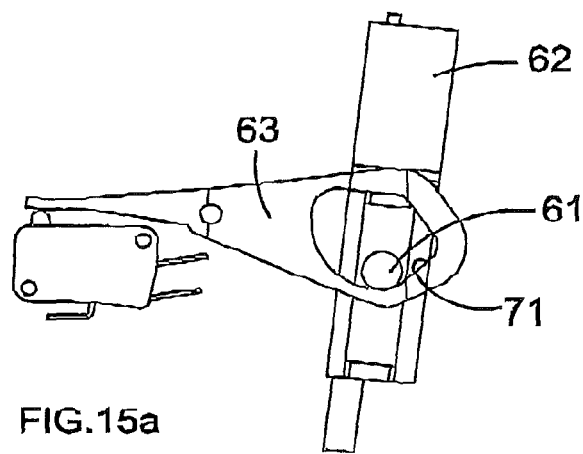
FIG. 15*a* is a side view of the switching mechanism of FIG. 14A in which the handle assembly is rotated through 90° relative to the housing and the switch and relay are in the open position.

Referring to FIG. 8, the hedge trimmer body housing (3) can be pivoted at 90° relative to the handle assembly (2). Referring now to FIG. 15a, the pin housing (62) is rotated through 90° from the position shown in FIG. 14a. Pin (61) now abuts third cam surface (71), and as the hedge trimmer housing has remained stationary, arm member (63) remains in the same position.

Figure 15B:
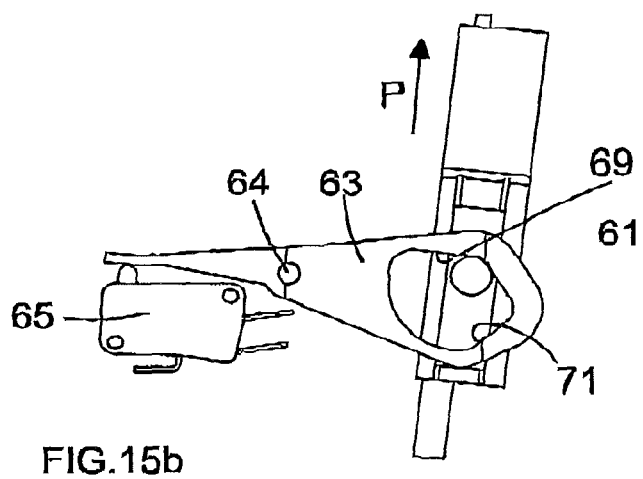
FIG. 15*b* is a side view of the switching mechanism of FIG. 15A in the partially closed position.

Referring now to FIG. 15b, when a user depresses a first switch (not shown), in the same way as shown in FIG. 14b except at 90° to FIG. 14b, pin (61) moves through a first distance in the direction of arrow P from cam surface (71) to cam surface (69). It can be seen however, that pin (61) has not moved sufficiently to pivot arm (63) about pin (64) to close relay (65).

Figure 15C:
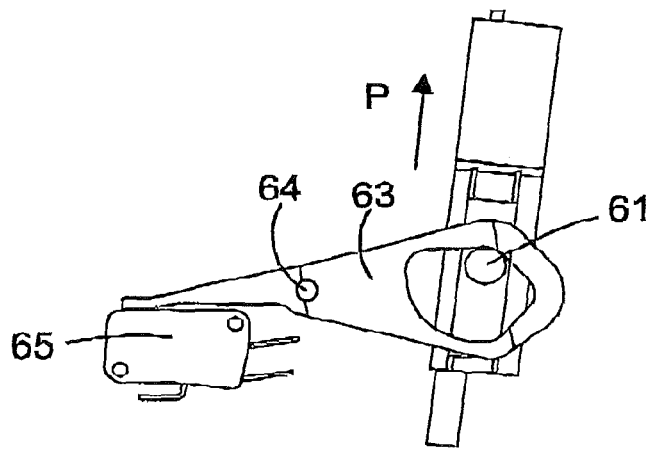
FIG. 15*c* is a side view of the switching mechanism of FIG. 15A in which the relay is closed.

Referring now to FIG. 15c, in order to close relay (65), the user must depress a second switch (not shown) which further moves pin (61) in the direction of arrow P thus pivoting arm (63) about pin (64) and completing the closure of relay (65).

Figure 11:
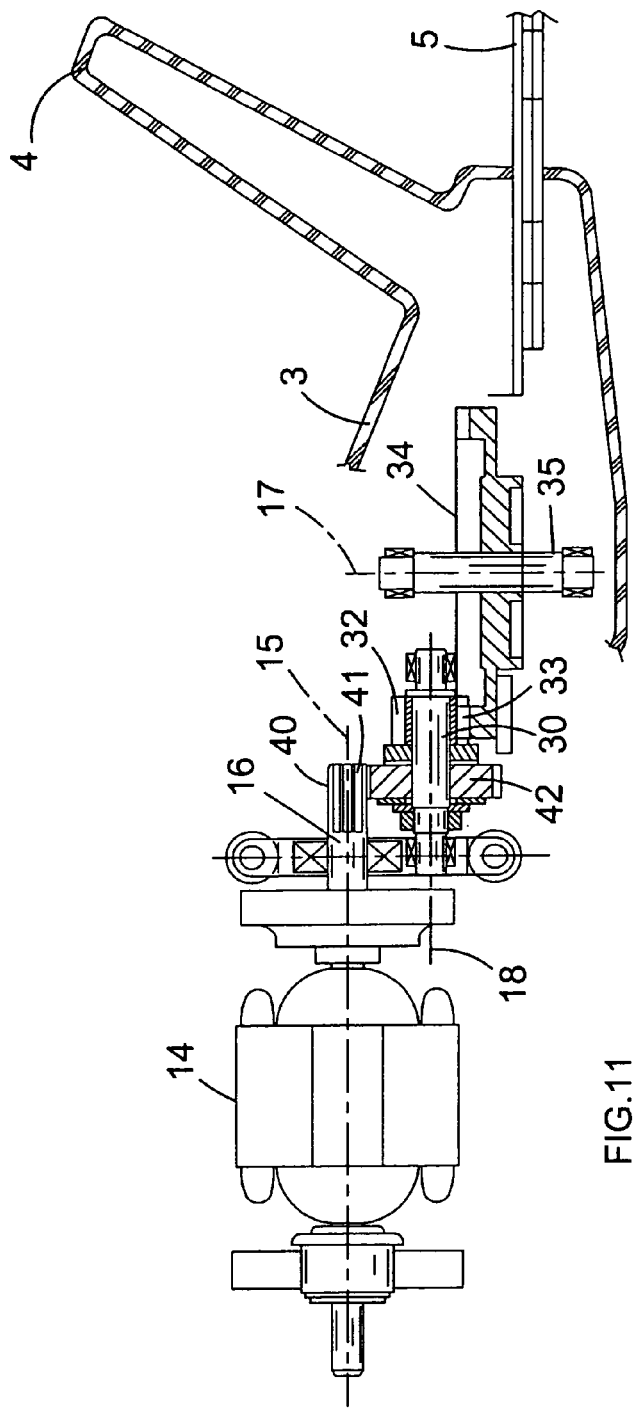
FIG. 11 is a side cross sectional view of the housing of a hedge trimmer incorporating the gear conversion mechanism of FIGS. 10a and 10b.

Referring now to FIG. 11, an electric motor (14) is disposed axially in housing (3), such that the axis of rotation (15) of the motor output shaft (16) is parallel to the plane of blade (5). It can be seen therefore that in order to drive the blade mechanism, the direction of rotation about axis (15) needs to be converted through 90° into rotation about axis (17).

Figure 10A:
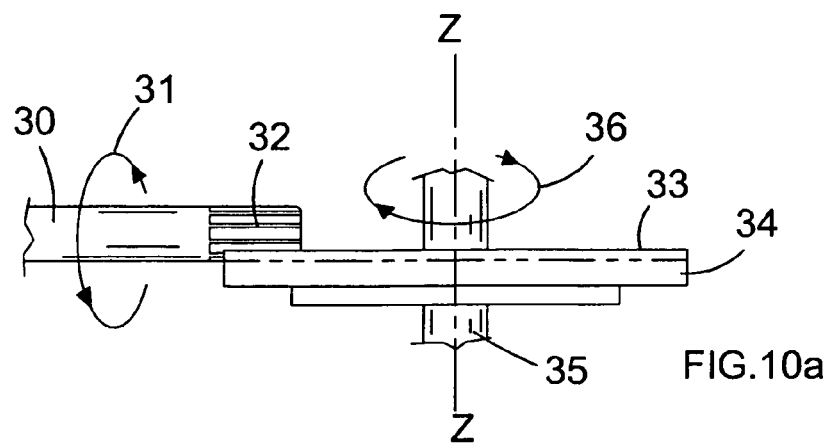
FIG. 10a is a cross sectional side view of the gear conversion mechanism of the present invention.
Figure 10B:
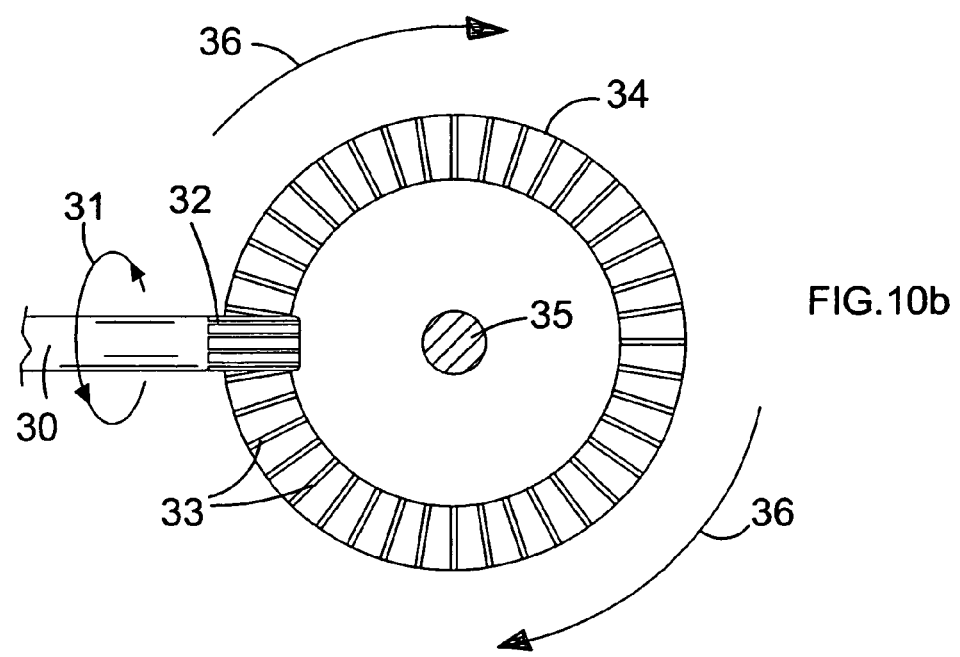

As shown in FIGS. 10a and 10b, the drive conversion mechanism of the present invention for converting rotation about a first axis to rotation about a second axis comprises a shaft (30) rotating in the direction of arrow (31). A plurality of axially aligned parallel teeth (32) are formed at the end of shaft (30). Parallel teeth (32) intermesh with a second plurality of radial teeth (33) formed on the upper surface of a gear plate (34). Gear plate (34) is mounted on a second shaft (35) such that gear plate (34) is free to rotate about an axis Z-Z. As a result of this, the rotation of shaft (30) imparts rotation to gear plate (35) in the direction of arrow (36) due to the reaction between teeth (32) and teeth (33).

This method of converting rotation about a first axis into rotation about a second axis generally perpendicular to said first axis is substantially cheaper to manufacture than prior art methods, as the engineering tolerances between teeth (32) and shaft (30) and teeth (33) on the gear plate (34) can be less than those needed to be achieved with the conical gears of the prior art drive mechanisms.

Referring again to FIG. 11, the incorporation of the drive conversion mechanism of FIGS. 10a and 10b into the hedge trimmer of the present invention will now be described.

An electric motor drives a rotary output shaft (16) adapted to rotate about axis (15). A plurality of teeth (40) are formed on the edge of shaft (16) and intermesh with a second plurality of teeth (41) formed on a gear (42). Gear (42) is adapted to rotate about axis (18) which is parallel to axis (15), and as gear (42) comprises a larger number of teeth (41) than the number of teeth (40) formed on output shaft (16), the rotational speed of gear (42) is less than that of output shaft (16). Gear (42) is mounted on a shaft (30) which has a further set of teeth (32) formed around the edge of shaft (30). Teeth (32) intermesh with a plurality of radial teeth (33) formed on the upper surface of a gear plate (34). Gear plate (34) is mounted on shaft (35) and adapted to rotate about axis (17) such that the rotation of shaft (30) about axis (18) is converted to rotation about axis (17) generally perpendicular to axis (18).

It can therefore be seen that the teeth on shaft (32) can still drive gear plate (34) despite variations in position between the shaft and the gear plate, provided the teeth on the shaft still engage the teeth on the gear plate. The shaft and gear plate therefore do not need to be as accurately located relative to each other as the bevel gears of the prior art.

It can also be seen that the inline rotation of the motor output shaft (16) is converted into rotation in the plane of blade (5). The blade (5) is connected to gear plate (34) via a drive conversion mechanism for converting rotary motion about axis (17) into linear reciprocating motion perpendicular to axis (17) in a manner which will be familiar to persons skilled in the art, such as a scotch yoke mechanism. Mechanisms of this type are well known in the art and will not be described herein in any further detail.

It will be appreciated by persons skilled in the art that the above embodiments have been described by way of example only and not in any limitative sense, and that various alterations and modification are possible without departure from the scope of the invention as defined by the appended claims.

The invention claimed is:

1. A power tool comprising:
    a housing, a motor provided in the housing, an output shaft actuating a working member to move in a reciprocating motion, and a movable handle assembly;
    wherein the handle assembly comprises a generally U-shaped front handle defining a first plane and a generally U-shaped rear handle defining a second plane perpendicular to the first plane, wherein the handles are formed as a unitary piece so that both handles move in unison, and a mounting portion mounted to the housing of the tool,
    wherein one of said front handle or rear handle is generally perpendicular to the axis of the working member in use and the other of said front handle or rear handle is generally parallel to the axis of the working member in use.

2. A power tool according to claim 1, wherein the front handle and the rear handle are oriented substantially perpendicular to one another and whose positions are fixed relative to one another.

3. A power tool according to claim 2, wherein said front and rear handles define a continuous loop.

4. A power tool according to claim 1, wherein said power tool is a hedge trimmer.

5. A power tool according to claim 1, wherein at least one of the front handle or rear handle can be rotated below the housing of the power tool.

6. A power tool comprising:
    a housing, a motor provided in the housing, an output shaft caused by said motor to actuate a working member to move in a reciprocating motion, and a rotatable handle assembly;
    wherein the handle assembly comprises a generally U-shaped front handle defining a first plane and a generally U-shaped rear handle defining a second plane perpendicular to the first plane, wherein the handles are formed as a unitary piece so that both handles move in unison, a mounting portion mounted to the housing of the tool;
    wherein said front handle forms an obtuse angle with the axis of the working member in use; and
    further comprising first switching means provided on said front handle, and second switching means formed on said rear handle, wherein said power tool is operable on actuation of both first and second switching means.

7. A power tool according to claim 6, wherein at least one of the front handle or rear handle can be rotated below the housing of the power tool.

8. A power tool comprising a housing, a motor provided in the housing, an output shaft caused by said motor to actuate a working member to move in a reciprocating motion, and a rotatable handle assembly;
    wherein the handle assembly comprises a generally U-shaped front handle defining a first plane and a generally U-shaped rear handle defining a second plane, wherein the handles are formed as a unitary piece so that both handles move in unison, wherein said first plane is generally perpendicular to the second plane; and
    a mounting portion mounted to the housing of the tool so that at least one of the front handle or rear handle can be rotated below the housing of the power tool.

9. A power tool according to claim 8, wherein the front handle and the rear handle are oriented substantially perpendicular to one another and whose positions are fixed relative to one another.

10. A power tool according to claim 8, wherein said front and rear handles define a continuous loop.

11. A power tool according to claim 8, further comprising first switching means provided on said front handle, and second switching means formed on said rear handle, wherein said power tool is operable on actuation of both first and second switching means.

12. A power tool according to claim 8, wherein said power tool is a hedge trimmer.

* * * * *